United States Patent
Hwang et al.

(10) Patent No.: US 9,862,622 B2
(45) Date of Patent: Jan. 9, 2018

(54) SUPERHYDROPHOBIC FILTER STRUCTURE FOR SELECTIVELY SEPARATING WATER AND OIL

(71) Applicant: POSTECH ACADEMY-INDUSTRY FOUNDATION, Pohang-si (KR)

(72) Inventors: Woon Bong Hwang, Pohang-si (KR); Handong Jo, Seoul (KR); Dong Seob Kim, Daegu (KR); Yeong Ae Kim, Incheon (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 0 days.

(21) Appl. No.: 14/408,331

(22) PCT Filed: Jun. 27, 2013

(86) PCT No.: PCT/KR2013/005716
§ 371 (c)(1),
(2) Date: Dec. 16, 2014

(87) PCT Pub. No.: WO2014/003464
PCT Pub. Date: Jan. 3, 2014

(65) Prior Publication Data
US 2015/0284269 A1    Oct. 8, 2015

(30) Foreign Application Priority Data
Jun. 28, 2012  (KR) .................. 10-2012-0070039

(51) Int. Cl.
*C02F 1/40* (2006.01)
*E02B 15/04* (2006.01)
(Continued)

(52) U.S. Cl.
CPC ................ *C02F 1/40* (2013.01); *B01D 17/10* (2013.01); *B01D 29/05* (2013.01); *E02B 15/045* (2013.01);
(Continued)

(58) Field of Classification Search
CPC .... C02F 1/40; C02F 2101/32; C02F 2101/30; C02F 2103/007; B01D 29/05;
(Continued)

(56) References Cited

U.S. PATENT DOCUMENTS 2,279,699 A * 4/1942 White ................. B01D 27/005
                                                 210/238
3,862,030 A * 1/1975 Goldberg ............... B01D 17/10
                                                 210/496

(Continued)

FOREIGN PATENT DOCUMENTS

| CN | 101970091 | 2/2011 |
|---|---|---|
| EP | 02499921 | 12/1987 |

(Continued)

OTHER PUBLICATIONS

Kim (KR 20110097150) Aug. 2011 KIPO machine translation.*

*Primary Examiner* — David C Mellon
*Assistant Examiner* — Liam Royce
(74) *Attorney, Agent, or Firm* — Lex IP Meister, PLLC

(57) ABSTRACT

A filter structure capable of efficiently separating water and oil using wettability is provided. The filter structure according to an exemplary embodiment of the present invention includes a first filter layer including a plurality of openings, a second filter layer including a plurality of openings and positioned so as to be overlapped with the first filter layer at a distance from each other, and a hydrophobic polymer layer formed on surfaces of the first filter layer and the second filter layer. The first filter layer and the second filter layer (Continued)

include surfaces each having a dual-scale protrusion and depression structure as a combination of a micro-scale structure and a nano-scale structure, and the hydrophobic polymer layer is formed along curves of the protrusion and depression structure.

9 Claims, 7 Drawing Sheets

(51) Int. Cl.
*B01D 17/00* (2006.01)
*B01D 29/05* (2006.01)
B01D 17/02 (2006.01)
C02F 101/32 (2006.01)
C02F 103/00 (2006.01)

(52) U.S. Cl.
CPC .. *B01D 17/0202* (2013.01); *B01D 2239/0421* (2013.01); *C02F 2101/32* (2013.01); *C02F 2103/007* (2013.01)

(58) Field of Classification Search
CPC ........ B01D 29/01; B01D 17/10; B01D 17/08; B01D 2239/0428; B01D 2239/0414; B01D 2239/04; B01D 17/0202; B01D 17/02; B01D 24/12; B01D 24/183; B01D 24/10; B01D 27/02; B01D 27/146; B01D 29/0027; B01D 29/0052; B01D 39/02–39/08; B01D 39/10; B01D 39/12; B01D 2101/00; B01D 2239/0407; B01D 2239/0478; B01D 69/147; B01D 2239/0421; E02B 15/045; E02B 15/04

USPC ....................................................... 428/550
See application file for complete search history.

(56) References Cited

U.S. PATENT DOCUMENTS

| | | | | |
|---|---|---|---|---|
| 4,168,229 | A * | 9/1979 | Chambers | B01D 17/045 210/649 |
| 4,197,204 | A * | 4/1980 | Mathes | B01D 17/0214 210/242.3 |
| 4,815,963 | A | 3/1989 | Berkhout | |
| 4,929,353 | A * | 5/1990 | Harris | B01D 29/05 210/237 |
| 5,705,076 | A * | 1/1998 | Brinkley | B01D 17/00 210/693 |
| 9,290,900 | B2 * | 3/2016 | Qin | B01D 17/0208 |
| 2010/0155326 | A1 * | 6/2010 | Grunert | D06F 58/22 210/507 |
| 2010/0316842 | A1 * | 12/2010 | Tuteja | D01D 5/003 428/143 |
| 2012/0111198 | A1 * | 5/2012 | Liu | B01D 39/1692 95/285 |

FOREIGN PATENT DOCUMENTS

| | | | |
|---|---|---|---|
| JP | 2005-111326 | 4/2005 | |
| JP | 2011520639 | 7/2011 | |
| KR | 10-0840892 | 6/2008 | |
| KR | 1020080051601 | 6/2008 | |
| KR | 10-1037192 | 5/2011 | |
| KR | 1020110066035 | 6/2011 | |
| KR | 1020110097150 | 8/2011 | |
| KR | 10-1149435 | 5/2012 | |
| WO | WO 2012065439 A1 * | 5/2012 | ......... B01D 17/0208 |

* cited by examiner

SUPERHYDROPHOBIC FILTER STRUCTURE FOR SELECTIVELY SEPARATING WATER AND OIL

TECHNICAL FIELD

The present invention relates to a filter structure capable of selectively separating water and oil, and more particularly, to a filter structure capable of efficiently separating water and oil using wettability.

BACKGROUND ART

Water pollution caused by industrial wastewater including a large amount of oil and oil spilled from a ship has had disastrous effects on the ecosystem, and an enormous amount of economic cost and time is required to restore polluted areas. For this reason, a technology for separating water and oil in wastewater and oil spilled on the sea has been suggested.

As conventional technologies of separating water and oil, an adsorption method and a gravity separation method are known. The adsorption method is a method of selectively absorbing oil only with an adsorbent. This method is limited in the amount of oil to be removed at once, and additional costs and secondary environmental pollution may be caused by treating the adsorbent absorbing oil.

The gravity separation method is a method of removing oil floating on water using a gravity difference between the water and the oil, and does not use consumables such as an adsorbent, resulting in a reduction in costs. However, this method has low efficiency in separating oil, and the separated oil includes lots of water, which makes it difficult to recycle the separated oil.

DISCLOSURE

Technical Problem

The present invention has been made in an effort to provide a superhydrophobic filter structure which has a simple structure and is capable of separating and collecting oil from water and oil mixtures with high efficiency.

Technical Solution

An exemplary embodiment of the present invention provides a filter structure including a first filter layer including a plurality of openings, a second filter layer including a plurality of openings and positioned so as to be overlapped with the first filter layer at a distance from each other, and a hydrophobic polymer layer formed on surfaces of the first filter layer and the second filter layer. The first filter layer and the second filter layer include the surfaces each having a dual-scale protrusion and depression structure as a combination of a micro-scale structure and a nano-scale structure, and the hydrophobic polymer layer is formed along curves of the protrusion and depression structure.

Each of the first filter layer and the second filter layer may be formed of a metal mesh made from a metal wire in the form of a mesh.

The protrusion and depression structure may include a first fine protrusion and depression structure formed in a micro-scale and a second fine protrusion and depression structure formed in a nano-scale along curves of the first fine protrusion and depression structure on a surface of the first fine protrusion and depression structure. The first fine protrusion and depression structure may be formed by any one method of sandblasting, shot blasting, plasma etching, a discharge treatment, and a laser treatment. The second fine protrusion and depression structure may be formed by an anodic oxidation process.

The hydrophobic polymer layer may include at least one hydrophobic material selected from a fluorine resin, a fluorine-based silane coupling agent, a fluorine-based isocyanate compound, an alkanethiol, an organic silane compound, a fatty acid, an aromatic azide compound, mixtures thereof, and polymers thereof.

The hydrophobic polymer layer may be formed by a method of coating the protrusion and depression structure with the hydrophobic material. Otherwise, the hydrophobic polymer layer may be present in the form of a monomolecular layer or a multimolecular layer by a covalent bond between the hydrophobic material and the surfaces of the first filter layer and the second filter layer. An oil layer may be present between the first filter layer and the second filter layer. The oil layer may be formed by allowing only oil to pass through the filter structure or by dipping the filter structure in oil.

An oil absorption layer formed of sponge may be present outside any one of the first filter layer and the second filter layer. The oil absorption layer may be present between the first filter layer and the second filter layer, and may include at least one selected from hydrogel, silica gel, activated alumina, zeolite, activated carbon, fabric, and sponge.

A reinforcing member may be present between the first filter layer and the second filter layer. The reinforcing member may be formed into any one of a metal rod, a metal mesh, a polymer rod, and a polymer mesh.

Advantageous Effects

A filter structure has a simple structure and has an opening size that has less effect on separation of oil and water, and it is also possible to easily collect oil from the filter structure absorbing the oil so as to be recycled.

MODE FOR INVENTION

The present invention will be described more fully hereinafter with reference to the accompanying drawings, in which exemplary embodiments of the invention are illustrated. As those skilled in the art would realize, the described embodiments may be modified in various different ways, all without departing from the spirit or scope of the present invention.

Figure 1:
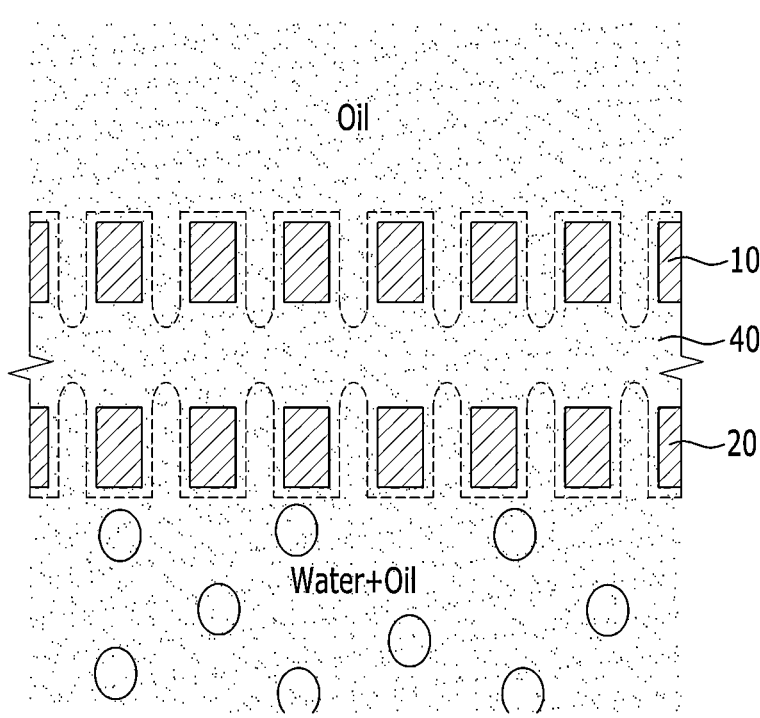
FIG. 1 is a schematic diagram illustrating a filter structure according to a first exemplary embodiment of the present invention.
Figure 2:
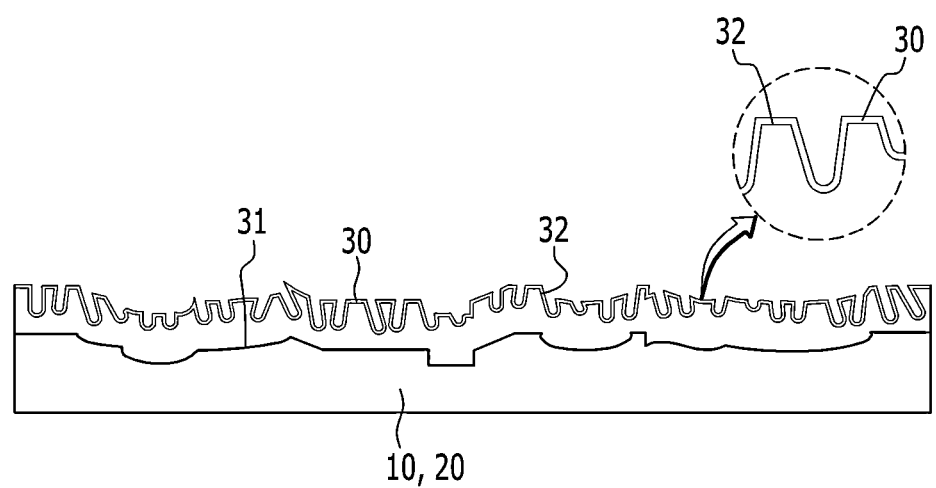
FIG. 2 is an enlarged diagram of a surface of a first filter layer and a second filter layer illustrated in FIG. 1.

FIG. 1 is a schematic diagram illustrating a filter structure according to a first exemplary embodiment of the present invention, and FIG. 2 is an enlarged diagram of a surface of a first filter layer and a second filter layer illustrated in FIG. 1.

Referring to FIG. 1 and FIG. 2, a filter structure 100 according to a first exemplary embodiment of the present invention includes a first filter layer 10 including a plurality of openings, a second filter layer 20 including a plurality of openings and positioned so as to be overlapped with the first filter layer 10 at a distance from each other, and a hydrophobic polymer layer 30 formed on surfaces of the first filter layer 10 and the second filter layer 20.

Each of the first filter layer 10 and the second filter layer 20 may be formed of a metal mesh made from a metal wire in the form of a mesh. Otherwise, each of the first filter layer 10 and the second filter layer 20 may be formed of a metal plate including a plurality of openings. The metal mesh can be flexibly deformed and has high strength, and thus it can be usefully applied as compared with the metal plate.

The first filter layer 10 and the second filter layer 20 include surfaces on which a first fine protrusion and depression structure 31 is formed in a micro-scale and a second fine protrusion and depression structure 32 is formed in a nano-scale along curves of the first fine protrusion and depression structure 31. Therefore, on the surfaces of the first filter layer 10 and the second filter layer 20, a dual-scale protrusion and depression structure as a combination of a micro-scale structure and a nano-scale structure is formed.

Herein, a micro-scale means a size in the range of 1 μm or more to less than 1000 μm, and a nano-scale means a size in the range of 1 nm or more to less than 1000 nm.

The first fine protrusion and depression structure 31 in a micro-scale may be formed by any one method of sandblasting, shot blasting, plasma etching, a discharge treatment, and a laser treatment.

The sandblasting is a method in which fine protrusions and depressions are formed by spraying fine sand particles using compressed air so as to collide with a target object. In the shot blasting, metallic or non-metallic fine particles called "shot" or "grit" are sprayed so as to form fine protrusions and depressions on a target object.

In the plasma etching, instead of an etching solution, gaseous plasma is used to etch a surface of a target object so as to form fine protrusions and depressions on the surface of the target object. The discharge treatment is a method in which a surface of a target object is melted with high-temperature heat generated by electric discharge and then resolidified, and fine protrusions and depressions are formed of irregular cracks and bubbles on the electrically-discharged surface of the target object. In the laser treatment, fine protrusions and depressions are formed by irradiating a high-power laser pulse to a target object and ablating a surface thereof.

The second fine protrusion and depression structure 32 in a nano-scale may be formed by an anodic oxidation process.

An anodic oxidation device (not illustrated) used in an anodic oxidation process may include a circulating tank in which cooling water is circulated and a magnet stirrer which stirs an electrolyte solution within the tank at a constant speed. The anodic oxidation process is carried out by immersing the first and second filter layers 10 and 20 and a counter electrode in the electrolyte solution within the tank and applying anode power and cathode power to the first and second filter layers 10 and 20 and the counter electrode, respectively.

As the anodic oxidation process proceeds, an oxide film is formed on the surfaces of the first and second filter layers 10 and 20, and fine grooves in a nano-scale are formed on the oxide film. The oxide film and the fine grooves are formed along curves of the first fine protrusion and depression structure 31, and thus on the surfaces of the first and second filter layers 10 and 20, a dual-scale protrusion and depression structure as a combination of the first fine protrusion and depression structure 31 and the second fine protrusion and depression structure 32 is formed.

If the hydrophobic polymer layer 30 is not present, the first filter layer 10 and the second filter layer 20 have superhydrophilic surfaces due to the protrusion and depression structure. However, in the present exemplary embodiment, the first filter layer 10 and the second filter layer 20 have superhydrophobic surfaces due to the hydrophobic polymer layer 30. The wettability means the extent of wetting easiness of water against a solid surface, and can be measured by a contact angle between a certain liquid and a solid surface. The case where a contact angle of a liquid is more than 90° is referred to as "hydrophobicity" and the case where a contact angle of a liquid is more than 150° is referred to as "superhydrophobicity".

The hydrophobic polymer layer 30 may include at least one hydrophobic material selected from a fluorine resin, a fluorine-based silane coupling agent, a fluorine-based isocyanate compound, an alkanethiol, an organic silane compound, a fatty acid, an aromatic azide compound, mixtures thereof, and polymers thereof.

The hydrophobic polymer layer 30 may be formed by a method of coating the protrusion and depression structure of the first and second filter layers 10 and 20 with the hydrophobic material. Herein, the coating may be carried out by immersing the filter structure in the coating solution or coating the surfaces with the coating solution using a low-pressure spray, washing the surfaces with nucleic acid and distilled water, and drying the surfaces in a high-temperature oven.

Further, the hydrophobic polymer layer 30 may be formed by a chemical bond between the hydrophobic material and the surfaces of the first filter layer 10 and the second filter layer 20. To be specific, the hydrophobic material may be present in the form of a monomolecular layer or a multi-molecular layer by a covalent bond between the hydrophobic material and the surfaces of the first filter layer 10 and the second filter layer 20.

The material of the hydrophobic polymer layer 30 has hydrophobicity in itself, and since the hydrophobic polymer layer 30 is formed to a very small thickness on the protrusion and depression structure of the first filter layer 10 and the second filter layer 20, it has the same pattern as the protrusion and depression structure. That is, the hydrophobic polymer layer 30 is formed to a constant thickness along curves of the second fine protrusion and depression structure 32 without filling up the second fine protrusion and depression structure 32. The hydrophobic polymer layer 30 may be formed into a monomolecular layer having a thickness in the range of 1 Å to 5 nm.

The hydrophobic polymer layer 30 includes higher portions corresponding to peaks and lower portions corresponding to valleys, and the portions corresponding to the peaks function as micro-protrusions to achieve hydrophobicity. Further, a protrusion structure formed on the hydrophobic polymer layer 30 so as to correspond to the second fine protrusion and depression structure 32 in a nano-scale functions as a nano-protrusion to achieve superhydrophobicity.

The hydrophobic polymer layer 30 includes air between micro-protrusions and nano-protrusions, and thus minimizes a contact area with respect to water. Therefore, the first filter layer 10 and the second filter layer 20 including the hydrophobic polymer layer 30 have superhydrophobic surfaces each having a contact angle of more than 150°.

Since the first filter layer 10 and the second filter layer 20 exhibit superhydrophobicity, the filter structure 100 is repulsive to water, and thus water cannot pass through the filter structure 100. However, since oil has lower surface energy than water, oil permeates into the filter structure 100, and oil can easily pass through the filter structure 100.

A space is present between the first filter layer 10 and the second filter layer 20, and the space is charged with a predetermined amount of oil when the filter structure 100 is used. That is, an oil layer 40 is present between the first filter layer 10 and the second filter layer 20. The oil layer 40 may be formed by allowing only oil to pass through the filter structure 100 or by dipping the filter structure 100 in oil before the filter structure 100 is used.

Although FIG. 1 illustrates an example where the filter structure 100 includes the two filter layers 10 and 20, the filter structure 100 may include three or more filter layers. In any case, each filter layer is positioned away from its adjacent filter layer and an oil layer is present between two adjacent filter layers.

If a water and oil mixture is allowed to pass through the filter structure 100 at a constant pressure, the oil easily passes through the filter structure 100, whereas the water cannot pass through the filter structure 100 due to a repulsive force caused by the oil layer 40 between the first filter layer 10 and the second filter layer 20. Therefore, the filter structure 100 can selectively discharge the oil from the water and oil mixture and separate the water and the oil with high efficiency.

Figure 3:
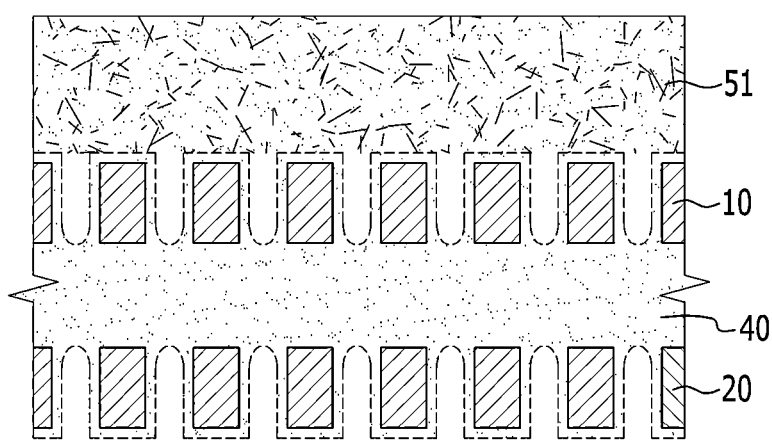
FIG. 3 is a schematic diagram illustrating a filter structure according to a second exemplary embodiment of the present invention.

FIG. 3 is a schematic diagram illustrating a filter structure according to a second exemplary embodiment of the present invention.

Referring to FIG. 3, a filter structure 110 of the second exemplary embodiment has the same configuration as the above-described filter structure of the first exemplary embodiment except that an oil absorption layer 51 is present outside any one of the first filter layer 10 and the second filter layer 20. The same members as those of the first exemplary embodiment are assigned the same reference numerals, respectively.

The oil absorption layer 51 may be formed of a sponge, and the filter structure 110 prevents the separated oil from being spilled from the filter structure 110 and recontaminating the water. The oil absorption layer 51 keeps the oil passing through the filter structure 110, and only the oil can be collected by wringing the oil absorption layer 51 and the collected oil can be recycled.

Figure 4:
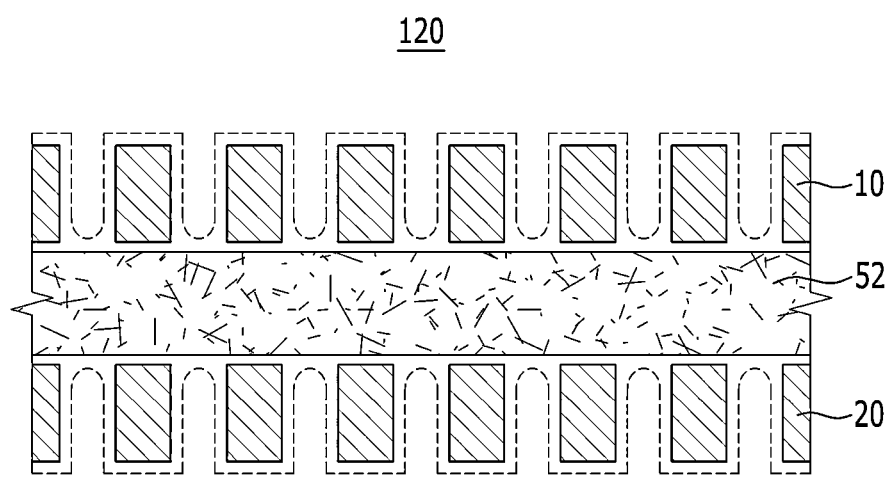
FIG. 4 is a schematic diagram illustrating a filter structure according to a third exemplary embodiment of the present invention.

FIG. 4 is a schematic diagram illustrating a filter structure according to a third exemplary embodiment of the present invention.

Referring to FIG. 4, a filter structure 120 of the third exemplary embodiment has the same configuration as the above-described filter structure of the first exemplary embodiment except that an oil absorption layer 52 is present between the first filter layer 10 and the second filter layer 20. The same members as those of the first exemplary embodiment are assigned the same reference numerals, respectively.

The oil absorption layer 52 has a function of absorbing and storing oil so as to maintain an oil layer between the first filter layer 10 and the second filter layer 20. Therefore, the filter structure 120 including the oil absorption layer 52 can prevent deviation of the oil layer even at a high pressure. Further, the oil absorption layer 52 has a function of preventing deformation of the filter structure caused by a pressure.

The oil absorption layer 52 may include at least one selected from hydrogel, silica gel, activated alumina, zeolite, activated carbon, fabric, and sponge.

Figure 5:
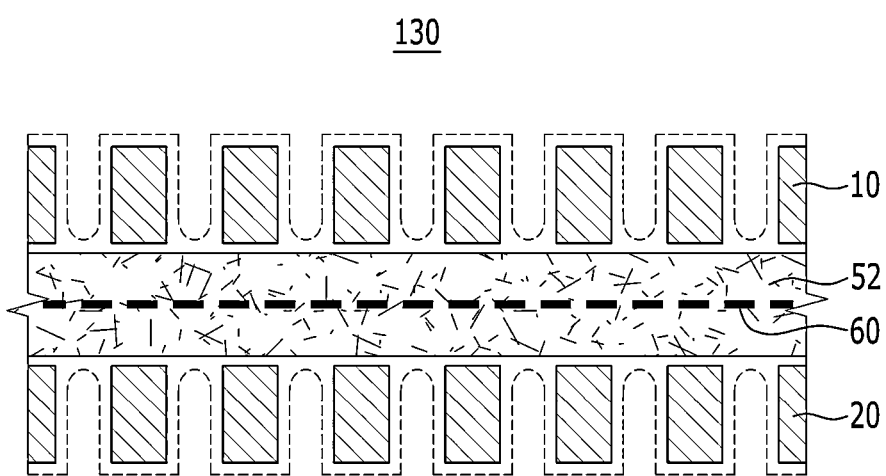
FIG. 5 is a schematic diagram illustrating a filter structure according to a fourth exemplary embodiment of the present invention.

FIG. 5 is a schematic diagram illustrating a filter structure according to a fourth exemplary embodiment of the present invention.

Referring to FIG. 5, a filter structure 130 of the fourth exemplary embodiment has the same configuration as the above-described filter structure of the first exemplary embodiment to the third exemplary embodiment except that a reinforcing member 60 is present between the first filter layer 10 and the second filter layer 20.

FIG. 5 illustrates an example where the oil absorption layer 52 is positioned between the first filter layer 10 and the second filter layer 20 and the reinforcing member 60 is positioned at the center of the oil absorption layer 52.

The reinforcing member 60 has a function of supporting the first filter layer 10 and the second filter layer 20 so as to not be deformed by a high pressure. The reinforcing member 60 may be formed into any one of a metal rod, a metal mesh, a polymer rod, and a polymer mesh. The filter structure 130 of the fourth exemplary embodiment can have improved structural stability with the reinforcing member 60.

Figure 6:
FIG. 6 is a diagram illustrating an application example of the above-described filter structure.

FIG. 6 is a diagram illustrating an application example of the above-described filter structure.

Referring to FIG. 6, the filter structure 100 can be manufactured in various shapes and various sizes depending on a purpose of use, and may be manufactured into, for example, a square mesh having a uniform width and breadth. In the case of an oil spill from a ship, the filter structure 100 can be thrown on oil spilled on the sea.

The filter structure 100 includes the superhydrophobic surface, and thus allows only oil to pass therethrough. Oil components of the oil spilled on the sea pass through the filter structure 100 so as to be stored within the filter structure 100 or within the oil absorption layer. Therefore, oil can be easily gathered by the filter structure 100, and the oil can be separated from the collected filter structure and then recycled.

Figure 7A:
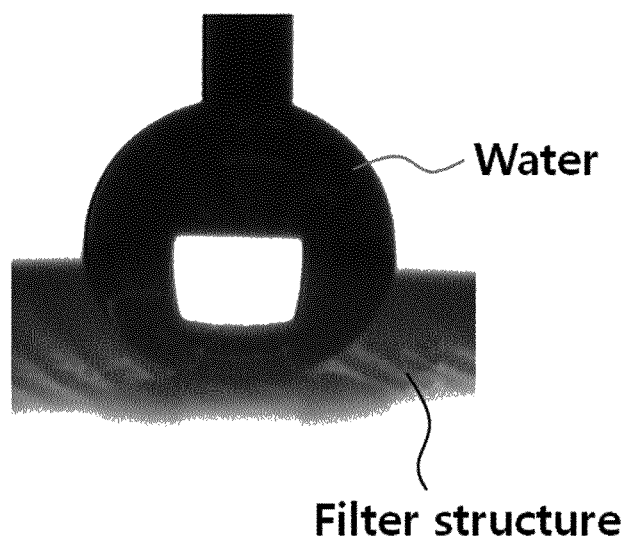
FIG. 7A is a photo taken after water is dropped to a filter structure according to the present exemplary embodiment.
Figure 7B:
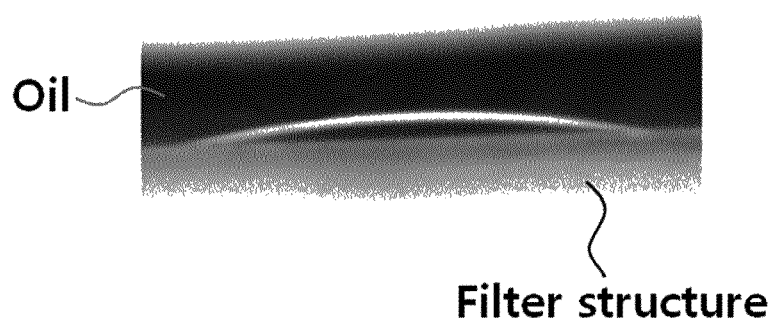
FIG. 7B is a photo taken after oil is dropped to the filter structure according to the present exemplary embodiment.

FIG. 7A is a photo taken after water is dropped to a filter structure according to the present exemplary embodiment, and FIG. 7B is a photo taken after oil is dropped to the filter structure according to the present exemplary embodiment. Referring to FIG. 7A and FIG. 7B, it can be confirmed that the filter structure of the present exemplary embodiment exhibits superhydrophobicity with respect to water and exhibits superlipophilicity with respect to oil.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A filter structure comprising:
a first filter layer including a plurality of openings;
a second filter layer including a plurality of openings and positioned so as to be overlapped with the first filter layer at a distance from each other;
a hydrophobic polymer layer formed on surfaces of the first filter layer and the second filter layer,
an oil layer positioned between the first filter layer and the second filter layer, and
an oil absorption layer positioned outside any one of the first filter layer and the second filter layer,
wherein each of the first filter layer and the second filter layer is formed of a metal mesh made from a metal wire in the form of a mesh,
the first filter layer and the second filter layer include surfaces each having a dual-scale protrusion and depression structure as a combination of a micro-scale structure and a nano-scale structure,
the hydrophobic polymer layer is formed along curves of the dual-scale protrusion and depression structure,
the oil layer includes a space charged with a predetermined amount of oil, so that water cannot pass through the filter structure due to a repulsive force caused by the oil layer,
the oil absorption layer absorbs oil passing through the filter structure, and
the oil absorption layer includes at least one material selected from a group consisting of hydrogel, silica gel, activated alumina, zeolite, activated carbon, and sponge, and keeps the oil passing through the filter structure.

2. The filter structure of claim 1, wherein the dual-scale protrusion and depression structure includes a first protrusion and depression structure formed in a micro-scale and a second protrusion and depression structure formed in a nano-scale along curves of the first protrusion and depression structure on a surface of the first protrusion and depression structure.

3. The filter structure of claim 2, wherein the first protrusion and depression structure is formed by any one method of sandblasting, shot blasting, plasma etching, a discharge treatment, and a laser treatment.

4. The filter structure of claim 2, wherein the second protrusion and depression structure is formed by an anodic oxidation process.

5. The filter structure of claim 1, wherein the hydrophobic polymer layer includes at least one hydrophobic material selected from a group consisting of a fluorine resin, a fluorine-based silane coupling agent, a fluorine-based isocyanate compound, an alkanethiol, an organic silane compound, a fatty acid, an aromatic azide compound, mixtures thereof, and polymers thereof.

6. The filter structure of claim 5, wherein the hydrophobic polymer layer is formed by a method of coating the dual-scale protrusion and depression structure with the hydrophobic material.

7. The filter structure of claim 5, wherein the hydrophobic polymer layer is present in the form of a monomolecular layer or a multimolecular layer by a covalent bond between the hydrophobic material and the surfaces of the first filter layer and the second filter layer.

8. The filter structure of claim 1, wherein the oil layer is formed by allowing only oil to pass through the filter structure or by dipping the filter structure in oil.

9. The filter structure of claim 1, wherein a reinforcing member is present between the first filter layer and the second filter layer, and the reinforcing member is formed into an object selected from a group consisting of a metal rod, a metal mesh, a polymer rod, and a polymer mesh.

* * * * *